April 15, 1941.  H. DICKENS  2,238,041

POWER CONTROL SYSTEM

Filed March 3, 1939   2 Sheets—Sheet 1

Inventor

Harry Dickens

By ………

Attorney

April 15, 1941.  H. DICKENS  2,238,041
POWER CONTROL SYSTEM
Filed March 3, 1939   2 Sheets-Sheet 2

Inventor
Harry Dickens
By
Attorney

UNITED STATES PATENT OFFICE 2,238,041

POWER CONTROL SYSTEM

Harry Dickens, Jersey City, N. J.

Application March 3, 1939, Serial No. 259,676

6 Claims. (Cl. 177—352)

This invention is directed to a power control system wherein the power initiation results from the presence of an object in a projected beam from the system, with the result of interrupting the balance between two thermionic tubes, and by such balancing create a power influence which may be indicated or recorded.

In a companion application filed February 25, 1936, Serial No. 65,737, there is described a system which includes independent thermionic oscillators of constant identical frequency which, when energized, provide means to provide radiant energy from one of said oscillators in a beam. The uninterrupted flow of energy from the particular object to be energized maintains an energy balance and in a circuit which includes electrical signaling or indicating means, under which conditions the signaling or indicating means is inoperative, the interposition of a body in the beam flow effecting the radiant energy directed in said beam and serving to change the plate current of that oscillator from which the beam flow radiant energy is directed. This creates variations in plate currents of the respective oscillators and unbalances the circuit to operate the signaling or indicating means.

The present invention is designed with a view to improving the circuits and disposition of the details of the system in the said application with the primary result of eliminating at least two variable condenser controls and providing for higher and more steady oscillations.

The invention is illustrated in the accompanying drawings, in which.

Figure 1:
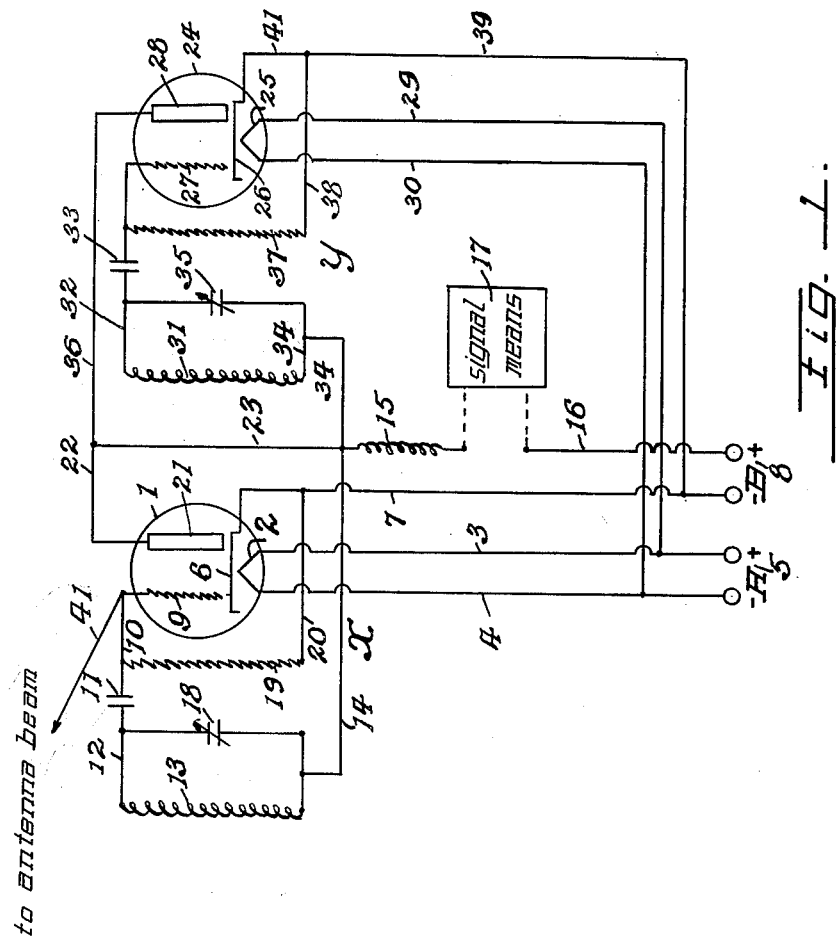
Fig. 1 is a diagrammatic view of one form of circuit for the improved system.

The present system is made up of two relatively shielded inter-related circuits, the first of which is indicated generally at X and the second of which is indicated generally at Y.

The details of the circuit X include a thermionic tube 1 having a filament 2 energized through conductors 3 and 4 connected respectively to the positive and negative sides of an A battery 5. The filament is surrounded by a cathode 6 of a material to free electrons when energized and is obviously energized through the heat of the filament, the cathode being connected by a conductor 7 to the negative side of a B battery 8.

The thermionic tube contains a grid 9 connected outside the tube to a conductor 10 leading through a condenser 11 through a conductor 12, a coil 13 and a conductor 14 which is connected through a choke coil 15 and to the positive side of the B battery 8 through a conductor 16. The conductors 15 and 16 lead through a signaling means or other work indicator at 17, which of course may be of any desired or conventional type.

A variable condenser 18 bridges the conductors 12 and 14 and functions as a tuning condenser while the by-pass condenser 11 controls the grid 9 which obviously has a negative potential through the provision of a grid resistor 19 leading from conductor 10 on the grid side of the by-pass condenser and through a conductor 20 which is connected to the conductor 7 leading to the negative side of the B battery. A plate 21 in the thermionic tube is connected by a conductor 22 to a conductor 23 leading to the input of the choke coil 15.

From the above arrangement, it will be apparent that there is a rapid accumulation of free electrons from the cathode which bombard the plate 21.

The details of the circuit Y, which is shielded from the circuit X, are substantially identical with the circuit X except that the grid circuit does not include the extended conductor beyond the coil of that circuit. The circuit Y, therefore, includes a thermionic tube 24 including a filament 25, a cathode 26 surrounding the filament, a grid 27 and a plate 28. The filament, and thereby the cathode, is energized by conductors 29 and 30 leading to the positive and negative sides of the A battery 5, being for convenience connected to the conductors 3 and 4.

The grid 27 is in circuit with a coil 31 by a conductor 32 in which is arranged a by-pass conductor 33. The coil 31 leads through a conductor 34, the conductor 15 and the input side of the choke coil. The conductors 32 and 34 are bridged by a variable condenser 35 for tuning purposes and the plate 28 of the tube 24 is connected by a conductor 36 with conductor 23. A grid resister 37 is connected to conductor 32 on the grid side of the by-pass condenser, such grid resister being connected by a conductor 38 to a conductor 39 which leads to the minus side of the B battery 8 and is extended beyond the connection with conductor 38 as a conductor 40 leading to the cathode 26.

In connection with the system described in the companion application referred to, the present system has an elimination on a plate feed back coil with circuits X and Y and also the insertion of a cathode in the thermionic tubes 1 and 24 to obtain higher and more steady oscillations. Furthermore, the present system eliminates two variable condenser controls to maintain the oscillations in a more steady flow without spilling, which spilling is very pronounced in a feedback circuit. Thus interruptions or cut-offs to the oscillations are eliminated.

A lead 41 to the antenna for the projected energy beam leads from the grid 9.

The operative effect of the system of circuits shown in Figure 1 may be described as follows: The lead 41 from the grid 9 of the thermionic tube 1 is connected to the antenna beam which may be of any design. The radiant energy which is emitted from the antenna beam has the function of producing a definite design in its track beyond the physical structure of the circuits, as described in my pending application Serial No. 65,737. As long as the beam projected from the system is not interrupted or intercepted in its flow beyond the physical parts of the circuits, no change in the system will occur.

The circuit Y of the system oscillates on a predetermined frequency which, in operation, permits no variation under any condition changes. The full amount of the flow of electrons is controlled by the grid 27 of the thermionic tube 24 and has a definite value which may be measured. The circuit X has a similar construction to that of circuit Y, is of the same constant frequency and is controlled in the same way as circuit Y. The amount of flow in the circuit X may, if desired, be measured with an appropriate meter. The plate 21 of the thermionic tube 1 is connected to the conductor 22 of circuit X and the plate 28 of the thermionic tube 24 of the circuit Y is coupled or connected through conductor 36 to the conductor 22. Both conductors 22 and 36 are energized by the conductor 23 through the choke coil 15, through the signal means 17, the conductor 16 from the B battery 8. As both tubes 1 and 24 of the respective circuits X and Y are identical, the amount of current supplied by the B battery 8 has a definite value and the amplitude of the radiant energy emitted into space by the antenna beam of circuit X will be the same as long as no interception of the flow of radiant energy occurs.

If an interception takes place at any point within the effective length of the emitted radiant energy beam beyond the physical parts of the circuits X and Y, a change of amplitude will result and may be registered by the signal means or other physical indication.

It is now well understood and accepted understanding of the electronic theory, that each frequency has a definite cycle which may be measured in wave length in meters and that a definite time has to elapse for a cycle to complete its full wave length of 360°. That is to say, starting from zero to a maximum positive at 90°, the value regarded is the largest; the value is then reduced to zero at 180° and then carried to maximum negative reading at 270° and again reduced to zero at 360° for the completion of the cycle. Each cycle is of course a repetition of the preceding one.

When the radiant energy is extended from the physical means of the circuits X and Y into a beam, the same phenomena will be recorded. Therefore, when an interception takes place within the extended beam of radiant energy, its function is a number of degrees out of phase and the normal cycle has been interrupted. Thus, into the reflection back into the system, the return will be a certain number of degrees ahead of time, and a change of the amplitude will be recorded by the signal means. These changes are due to the action of the grid of the thermionic tube 1 of the circuit X and the ionic constant, that is the accumulation, makes the grid more or less of negative value. As the grid is the controlling factor for the flow of electrons, the plate current will naturally either rise or fall according to the relative values of the change taking place. This constitutes the amplitudinal change which is recorded by the signal means.

Figure 2:
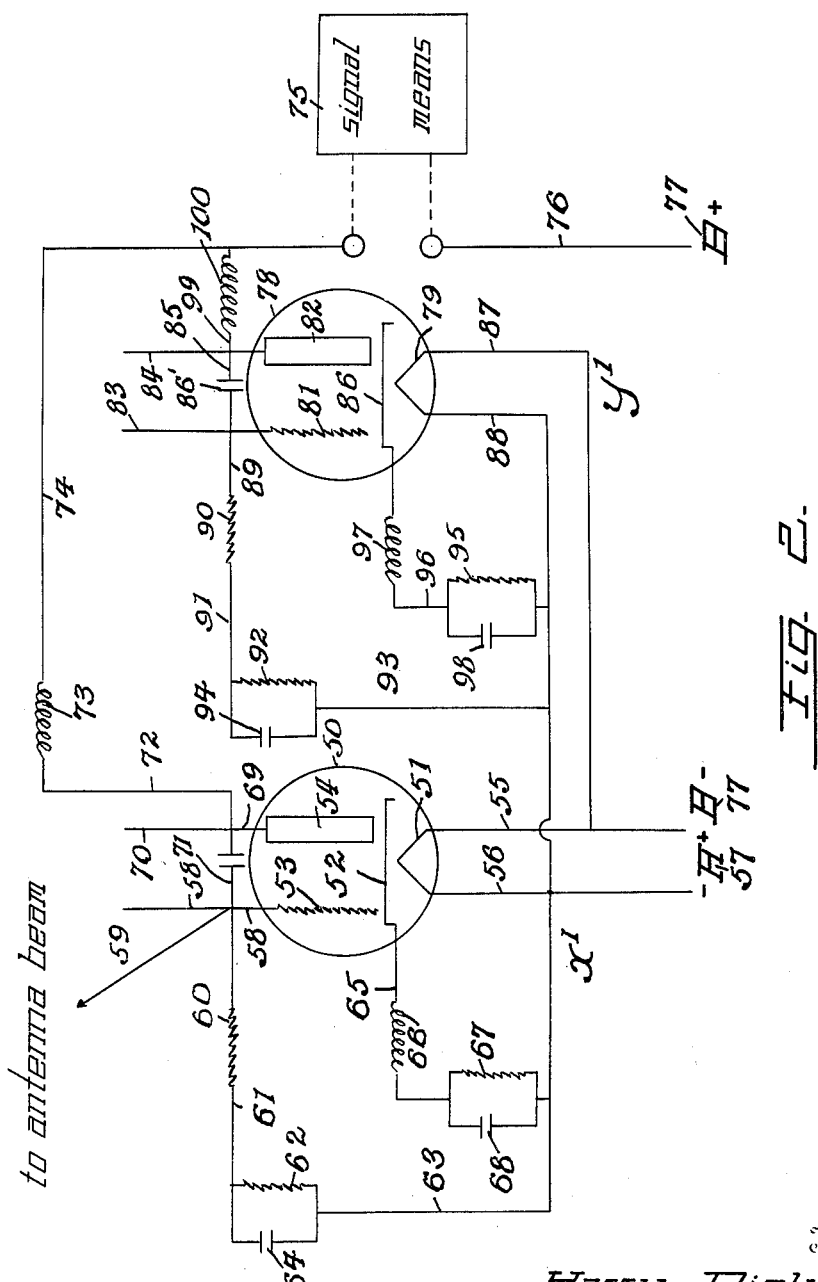
Fig. 2 is a similar view of another form of circuit for the system.

The circuiting details of Figure 2 are made up of two relatively shielded inter-related circuits, the first of which is indicated at $X^1$ and the second of which is indicated at $Y^1$. The details of the circuit $X^1$ include a thermionic tube 50, including a filament 51, surrounded by a cathode 52 of a character to emit electrons, a grid 53 and a plate 54. The filament is energized through conductors 55 and 56, leading from a source of energy, as the positive and negative sides respectively of an A battery 57. The output from the grid 53 is through a conductor 58, and from which a lead 59 extends to provide the antenna beam. The conductor 58 leads through a resistance 60, a conductor 61, a resistance 62, and a conductor 63, which is connected to the filament conductor 56. The circuit including the resistance 62 and the conductors 61 and 63 is bridged by a fixed condenser 64. The cathode 52 is connected through a conductor 65, a choke coil 66, a resistance 67, to the conductor 63, the resistance 67 being bridged by a fixed condenser 68.

The plate 54 of the tube is bombarded by free electrons under their rapid accumulation produced by the cathode 52, as will be apparent. The plate beyond the tube is connected to a conductor 69, which is connected to the conductor extension 58 by a conductor 70, leading through a fixed condenser 71 to thus form a linear circuit oscillator. The conductor 69 is extended as a conductor 72 through a choke coil 73 and through conductor 74 to a signal means or other indicator 75, and from such indicator through conductor 76 to the positive side of the B battery 77.

The circuit $Y^1$ is identical with circuit $X^1$ except that the grid circuit does not include the extended conductor beyond the grid coil of that circuit. The circuit $Y^1$ includes a thermionic tube 78 and a filament 79, a cathode 86 surrounding the filament, a grid 81, and a plate 82. Conductors 83, 84, connected by a conductor 85, through a fixed condenser 86', insure linear oscillations. The filament is energized by conductors 87, 88, energized from the positive and negative sides of the A battery 57. The grid is held negative through a conductor 89, through a resistor 90, conductor 91', a resistor 92, and a conductor 93 that feeds into the conductor 88, the resistor 92 being bridged by a fixed condenser 94. A resistor 95 in a conductor 96 is connected to conductor 88 and feeds through a choke coil 97 to the cathode 86, the resistor circuit being bridged by a fixed condenser 98, to insure a fixed negative bias. The conductor 84 of plate 82 is connected by a conductor 99 through a choke coil 100 to conductor 74.

The conductors 58 and 69 of the circuit $X^1$ and conductors 83 and 84 of circuit $Y^1$ are of a particular length to agree with the frequency employed and are placed in such proximity as to assure positive oscillations with the bridging capacitator 71 and 86' between the conductors referred to.

The conductor 59 of the system of Figure 2 connects to the antenna beam and radiant energy is emitted from the antenna beam beyond the physical structure of the circuits $X^1$ and $Y^1$ maintains a definite value. With no interruption of the emitted energy beam, the values, that is the amplitude, in both circuits $X^1$ and $Y^1$ are the same. When interruption occurs in the beam, the effective length of the beam is affected, the grid 53 of the thermionic tube 50 is influenced and made more or less of a negative value. The grid, which is the controlling member of the electronic flow, in turn raises or reduces the amplitude characteristics against the even flow of the thermionic tube 78 in circuit $Y^1$, thus compelling a recording in the signal means 75.

The phase changes and reflections created by the interception taking place in the antenna beam to effect recordings with the signal means are the same as in Figure 1.

In this form of the invention it is noted that the tubes are connected in parallel to their source of energy, that each grid connection leads to the source of energy through fixed resistance and a fixed condenser, and that the plates of the respective tubes are connected through a choke coil to each other. The tubes are of constant identical frequency, and as the radiant energy discharged over the antenna from oscillating tube 50 would, of itself, change the oscillations of that tube while the oscillations of tube 78 remain constant. It is apparent that the respective tubes beat against each other out of phase and that the reduction in plate current of tube 50 will be balanced by the plate current of tube 78 as long as the energy is flowing uninterruptedly through and beyond the antenna. Under this balanced relation, the oscillations of the tubes, still out of phase, are nevertheless of identical oscillation. This is the working condition where the radiant energy is flowing through the antenna and beyond, while the tubes are out of phase of identical frequency and of the same oscillation. When the flow of radiant energy through the antenna is interrupted by the presence of obstruction, the plate current of tube 50 is increased, and as the plates of the respective tubes are directly connected, the excess energy of plate 54 reaches plate 82 and would otherwise tend to increase the oscillations of tube 78 in the absence of an outlet for this increased energy. However, it will be noted that plate 82 is connected to the signal relay and that the excess energy flowing as described from plate 54 of tube 50 will not disturb the oscillation of tube 78 but will flow to the signal energizing means and inaugurate the signal. The tubes are again under the same oscillation, but the signal has been inaugurated—for if the signal energy does not absorb the excess plate current, it is adjusted between the respective plates to again restore their balance.

When the interruption of the antenna energy is removed, the energy of plate 54 is again reduced and the excess energy of plate 82, due to the direct coupling between the plates, again restores the balance of the working condition.

This application is a continuation in part of my application filed February 25, 1936, Serial No. 65,737.

What is claimed to be new is:

1. A power control system including two thermionic oscillators connected in parallel to the source of energy, with the connection including a fixed resistance and a fixed condenser, the plates of the respective tubes being directly coupled, a signalling means in circuit with the plate of both of the tubes, and an antenna leading from the grid of a single one of said tubes, the flow of energy through the antenna initially reducing the plate current of that tube to cause the tubes to beat against each other out of phase, the plate currents of the respective tubes incident to their direct coupling establishing a current balance to maintain a constant similar oscillation of the tubes while the energy is flowing from the antenna, interruption in the flow of the antenna oscillation increasing the current of the plate from the tube to which the antenna leads, and causing an unbalanced oscillation of the tubes and thereby increasing the plate current of the other tube, with the excess current directed through the connection to the signal for energizing the same.

2. A construction as defined in claim 1 wherein in each tube a cathode is connected in the oscillator circuit through a fixed condenser and fixed resistance.

3. In a signalling system, a plurality of vacuum tubes, of associated circuits, of power supply circuits and a signalling device, comprising at least two radio frequency vacuum tubes, two tuned radio frequency circuits, a power supply current and a signalling device circuit, with one of said two radio frequency circuits associated with one of said radio frequency tubes, said tuned radio frequency circuits being directly coupled, said radio frequency vacuum tubes and said associated tuned radio frequency circuits being adjusted to establish a predetermined phased relationship between oscillatory currents in said tuned radio frequency circuits at a predetermined frequency, said power supply current associated with said signalling device circuit and said tuned radio frequency circuits, and means for changing the said predetermined phased relationship between the oscillatory currents in said tuned radio frequency circuits, whereby the current in the power supply circuit associated with said signalling device circuit actuates said signalling device.

4. In a vacuum tube oscillatory system, at least two radio frequency vacuum tubes, one of said vacuum tubes being associated with a tuned radio frequency circuit, one terminal of said circuit being connected to the grid of said tube and the associated terminal of said circuit being connected to the plate of said tube, another of said vacuum tubes associated with another tuned radio frequency circuit and likewise and similarly connected thereto, a common source of potential for the plates of the two vacuum tubes, the two radio frequency circuits being directly connected to a predetermined degree to normally maintain a balance, means associated with the said tuned radio frequency circuits to affect the normal balance and to reverse the direction of the plate current flow in one tube without affecting the direction of the plate current tube in the other flow during the period of each consecutive half cycle, the two said circuits being directly coupled to the same degree.

5. A control for power circuits including two thermionic oscillators, shielded from each other, directly coupled on their anode sides, of identical frequency, and arranged 180° out of phase to create and maintain a natural balance, a unidirectional beam flow applied to the grid side of one of the oscillators without affecting the balance between the oscillators as long as the unidirectional beam flow is not intercepted, and a signal means included in the energy supply means to the oscillators, the interception of the unidirectional beam flow causing an unbalanced relation of the oscillators, the effect of the oscillators in their attempt to again reach a natural balance creating a force to energize the signal means.

6. A power control system including two thermionic oscillators, shielded from each other and independent of each other, the oscillators being directly coupled on the anode side of each, having identical frequency and being 180° out of phase to create and maintain a natural balance relative to each other, a unidirectional flow coupled to the grid member of one oscillator and included as a feature of the natural balance between the oscillators as long as said beam flow is uninterrupted, and a signal means included in the energy circuit for the transformer for the oscillators, the interruption of the beam flow disturbing the natural balanced relation between the oscillators with such unbalanced relation creating an amplitude change in the oscillations, with the change in balance between the oscillators incident to such amplitude change varying the current effect on the signal means to energize the latter.

HARRY DICKENS.